3,436,413
PROCESS FOR THE ISOLATION OF
PHOSPHATIDYL SERINE
Antonia Okany, Weston, Ontario, Canada, assignor to
Canada Packers Limited, Toronto, Ontario, Canada
No Drawing. Filed Dec. 21, 1965, Ser. No. 515,465
Int. Cl. C07f 9/10
U.S. Cl. 260—403                                    19 Claims

ABSTRACT OF THE DISCLOSURE

This invention relates to the extraction and recovery of phosphatidyl serine from mammalian brain tissue. The process of the invention involves three main steps: (1) extraction of the brain tissue and recovery of a total lipid extract, (2) precipitation of crude phosphatidyl serine from the total lipid extract, and (3) purification of the crude phosphatidyl serine. The method yields phosphatidyl serine, with only minor amounts of impurities, in the order of 0.2% of wet brain or greater. The product exhibits good blood anticoagulant activity in the thromboplastin generation test.

---

Some phospholipids are known to exert profound effects on the blood clotting mechanism. In fact, the presence of certain phospholipids in blood is essential for coagulation to take place. While the exact role of the blood phospholipids is not known, it has been found that phosphatidyl serine prolongs clotting times. This effect can be observed in vitro and in vivo. The present invention is useful for providing a phosphatidyl serine product for anti-coagulant therapy.

While phosphatidyl serine fractions have been obtained in small amounts on a laboratory scale from brain tissue by known solvent extraction and fractionation procedures, the procedure is complicated and tedious, yields are low and the results are not reproducible either as to yield or purity.

It is an object of the present invention, therefore, to provide a relatively simple and efficient process for isolating phosphatidyl serine from the animal brain.

Another object of the invention is to provide a process for obtaining phosphatidyl serine fractions in good yield from animal brain in a reproducible and economical manner adapted for relatively large scale production.

A further object of the invention is to provide a process for obtaining a phosphatidyl serine fraction of good blood anti-clotting activity from brain tissue.

These objects are accomplished by the process of the invention which involves three main steps comprising (1) extraction of the brain tissue and recovery of a total lipid extract, (2) precipitation of crude phosphatidyl serine from the total lipid extract, and (3) purification of the crude phosphatidyl serine. The invention, in more detail, comprises extracting brain tissue with a single phase solvent system comprising chloroform, methanol and water, adjusting the proportion of solvents in the extract to effect phase separation into aqueous and chloroform phases, separating the extract from the residual material, separating the chloroform phase from the aqueous phase and evaporating chloroform to provide a total lipid fraction containing the phosphatides and other lipids, dissolving the total lipid extract in a chlorinated solvent such as chloroform, methylene chloride or ethylene dichloride, precipitating a crude phosphatidyl serine fraction from the solution with a lower aliphatic alcohol or lower aliphatic alcohol-ketone mixture, e.g. ethane-acetone, and purifying the crude phosphatidyl serine fraction by extraction with a chlorinated solvent or with a mixture of chlorinated solvent with diethyl ether or low boiling hydrocarbon solvent, e.g. chloroform, chloroform-diethyl ether or chloroform-petroleum ether, followed by evaporation of the extraction solvent, redissolution of the residual material in chloroform and precipitation of phosphatidyl serine with a lower aliphatic alcohol.

The process is applicable to mammalian brain tissue of any source, fresh wet beef or hog brain from packing houses comprising a convenient and economical source material. The brain may be cleaned by removal of the membrane and washing. It is then comminuted and subjected to the initial extraction procedure. For convenience, the brain tissue may be comminuted in the presence of at least a part of the extracting solvent.

The proportions of chloroform, methanol and water in the extraction mixture are fairly critical. They should be such that initially there is a three-component one-phase system which will extract substantially all of the lipids along with some of the proteins from the brain tissue. A mixture of chloroform, methanol and water (including water derived from the tissue) in proportions, volume/volume/volume, of approximately 1:2:0.8 generally provides such a system. However, it is preferred to define the proportions in terms of function since the optimum proportions may vary with the type of material treated. One skilled in the art can readily determine, by simple experimentation, the optimum proportions for any given material. The composition of the solvent system is then changed by addition of more chloroform and water, until concentrations are reached at which the system separates into two phases, an upper aqueous phase and a lower chloroform phase. After filtration of the extract from residual tissue, the two phases are separated, the upper aqueous phase carrying the proteins and the lower chloroform layer containing the lipids.

Since wet brain material contains approximately 80% water, the initial extracting solvent may be chloroform-methanol in 1:2 proportions in sufficient quantity to provide with the water of the brain a 1:2:0.8 (chloroform-methanol-water) system and additional chloroform and water added, as desired, at later intervals. A convenient method of increasing the chloroform content of filtered extract, while at the same time recovering additional phospholipid material, is to wash the residual tissue from the first extraction with chloroform and combine the chloroform extract with the chloroform-methanol-water extract.

The chloroform layer containing the phospholipids, recovered after phase separation, may be dried in any desired manner which does not adversely effect the phospholipid activity. Vacuum evaporation at temperatures below 50° C. is satisfactory. The upper aqueous layer is either discarded or used for recovery of the other materials.

The total lipid extract obtained by evaporation of the chloroform phase is treated to precipitate crude phosphatidyl serine. This is accomplished by dissolving the total lipid extract in a chlorinated solvent, such as chloroform, methylene chloride, ethylene dichloride or other chlorinated solvents of similar solvent characteristics, and precipitating the crude phosphatidyl serine by addition of a lower aliphatic alcohol or alcohol-ketone mixture. The precipitating solvent may be, for example, methanol, ethanol or propanol or a mixture of the selected alcohol with acetone, methyl ethyl ketone or methyl isobutyl ketone. Good results are obtained with ethanol-acetone in 1 (or greater):1 v./v. proportions. Best results are obtained with ethanol-acetone in about 3:1 v./v. proportions. However, crude phosphatidyl serine can be precipitated by any of the solvents and solvent mixtures described.

Purification of the precipitated phosphatidyl serine is accomplished by extraction of the crude material with a chlorinated solvent or solvent mixture such as chloroform-petroleum ether, chloroform-diethyl ether, methylene chloride, ethylene dichloride or ethylene dichloride-petroleum ether. In lieu of petroleum ether, any low boiling petroleum hydrocarbon or fraction, e.g. hexane or pentene, may be used in the solvent mixture. The extract is filtered, and the filtrates are evaporated to dryness. The residue is then dissolved in chloroform and phosphatidyl serine is precipitated in good overall yield and anti-coagulant activity by the addition of a mixture of ethanol and acetone, preferably in proportions of about 1:1 to 3:1 v./v. purified phosphatidyl serine fractions, obtained by the presently described procedure, when examined by thin-layer chromatography according to the method of Grisdale and Okany in Canadian Journal of Biochemistry, 43, 781 (1965), show only minute amounts of impurities. Overall yield of the purified material, based on wet brain, is in the order of 0.2% or greater. The purified material exhibits good anti-coagulant activity in the two-stage thromboplastin generation test. This test is described by Biggs and Douglas in Journal of Clinical Pathology, 6, 23 (1953), and is widely used in this type of work. See, for example, Dailey et al. United States Patent No. 3,089,820 issued May 14, 1963.

The invention is further illustrated by the following examples of practice:

Example 1

A. Fresh wet beef brain (100 g.) was homogenized for 2 minutes in a blender with a mixture of chloroform (100 ml.) and methanol (200 ml.). Chloroform (100 ml.) and distilled water (100 ml.) were added in succession, and the mixture was homogenized for 30 seconds after each addition. The bi-phasic solvent mixture was separated from residual tissue by filtration, and the residual tissue was re-extracted with chloroform (150 ml.) for 1 minute. Again, the residue was separated by filtration, and the filtrates were combined. The lower layer of the combined filtrates, containing the lipids, was separated and subjected to evaporation under vacuum in a water bath having a temperature of about 30° C. to obtain 7 g. of a "total lipid extract."

B. The "total lipid extract" was dissolved in 20 ml. of chloroform and the solution was poured into a solvent mixture (300 ml.) composed of ethanol and acetone, 1:1, which was stirred constantly. Stirring was continued for 10 minutes, the precipitate was allowed to settle, and the supernatant liquid was decanted. The precipitate was washed first with the precipitating mixture (ethanol-acetone), then with acetone. The dry "crude phosphatidyl serine" in a yield of 1.6 g. was separated from the acetone by filtration.

C. The "crude phosphatidyl serine fraction" was extracted by stirring it for 15 minutes with a mixture of chloroform (15 ml.) and petroleum ether (B.P. 30–60° C.) (30 ml.). The liquid was filtered off, and the extraction was repeated. The filtrates were combined and evaporated in vacuo. The residual solid (1 g.) was then dissolved in chloroform (10 ml.) and a mixture (100 ml.) of ethanol and acetone, 1:1, was added. The supernatant liquid was removed by decantation, and the precipitate was washed first with the solvent mixture, then with acetone, filtered and dried in vacuo.

Yield of "purified phosphatidyl serine fraction" was 0.27 g. (0.27%). The product, which according to thin layer chromatographic analysis consisted mainly of phosphatidyl serine, had a good anti-coagulant activity when tested in the thromboplastin generation test.

Example 2

Hog brain (100 g.) was treated in the same way as described for beef brain in Example 1.

The procedure yielded 0.21 g. (0.21%) of "purified phosphatidyl serine fraction," the thin layer chromatographic picture of which showed similar composition to that of the "purified phosphatidyl serine fraction" obtained from beef brain. The anti-coagulant activity of the product was also similar to that of the beef brain fraction.

Example 3

"Total lipid extract" (8.8 g.), obtained from beef brain (100 g.) as described in Example 1A was dissolved in chloroform (100 ml.). A mixture (350 ml.) of acetone and ethanol, 1:1, was added. The precipitate was treated as described in Example 1B and C.

The yield of the "purified phosphatidyl serine fraction" was 0.26 g. (0.26%). The purity and anti-coagulant activity of the product were similar to those described in Examples 1 and 2.

Example 4

"Total lipid extract" (8.0 g.), obtained from beef brain (100 g.) as described in Example 1A was taken up in methylene chloride (75 ml.) and precipitated with a mixture (250 ml.) of ethanol and acetone, 1:1. The precipitate was then processed in the same way as in Example 1B and C.

Yield of "purified phosphatidyl serine fraction" was 0.27 g. (0.27%) of similar composition and anti-coagulant activity as those of the products in Examples 1–3.

Example 5

The procedure described in Example 4 was repeated using ethylene dichloride to replace the methylene chloride used for dissolving the "total lipid extract".

Yield of this product was 0.16 (0.16%). It was of similar quality to those described in Examples 1–4.

Example 6

"Total lipid extract" (9.3 g.), obtained as described in Example 1A, was dissolved in chloroform (50 ml.) and precipitated with ethanol (300 ml.). The precipitate was treated as described in Example 1B and C.

This procedure yielded 0.32 g. (0.32%) of the "purified phosphatidyl serine fraction", the composition and anti-coagulant activity of which were similar to those described before.

Example 7

"Total lipid extract" (7.0 g.), obtained from beef brain (100 g.) in the manner described in Example 1A, was dissolved in chloroform (70 ml.) and precipitated with a mixture (300 ml.) of ethanol and methyl ethyl ketone, 1:1. The precipitate obtained was treated in the same way as described in Example 1B and C.

Yield of "purified phosphatidyl serine fraction" was 0.08 g. (0.08%) of similar properties to those described in Examples 1–6.

Example 8

The procedure described in Example 7 was repeated but the methyl ethyl ketone used as part of the precipitating agent was replaced by methyl isobutyl ketone.

Yield was 0.09 g. (0.09%) of the "purified phosphatidyl serine fraction" of similar properties to those described in Examples 1–7.

Example 9

The procedure described in Example 7 was followed but a mixture of acetone and n-propanol, 1:1, was used as precipitating agent.

The yield was 0.15 g. (0.15%) of a "purified phosphatidyl serine fraction" of similar purity and anti-clotting activity to those described before.

Example 10

The n-propanol, used in Example 9 as part of the precipitating mixture, was substituted by methanol. The procedure yielding 0.30 g. (0.30%) of the "purified phosphatidyl serine fraction" of somewhat inferior purity. The anti-clotting activity, however, did not show significant differences as compared to the other samples.

Example 11

"Crude phosphatidyl serine fraction" (0.83 g.) was obtained from beef brain (100 g.) by the method described in Example 1A and B. In the extraction described in part C of Example 1, the petroleum ether was substituted by diethyl ether.

Yield was 0.30 g. (0.30%) of "purified phosphatidyl serine fraction" of similar quality to those described in Examples 1–9.

Example 12

"Crude phosphatidyl serine" (0.94 g.), prepared according to the procedure of Example 1A and B, was purified by extraction with methylene chloride instead of chloroform-petroleum ether used in Example 1C. The yield of purified phosphatidyl serine was 170 mg., and the product exhibited the same anti-clotting activity as those observed in the products of the previous examples.

Example 13

Purified phosphatidyl serine was obtained by the procedure of Example 12, except that ethylene dichloride was used instead of methylene chloride. The yield was 110 mg., and the product was similar to those obtained in the previous examples wtih respect to anti-clotting activity and thin layer chromatographic analysis.

Example 14

Purified phosphatidyl serine was obtained by the procedure of Example 13, except that ethylene dichloride-petroleum ether was used instead of ethylene dichloride alone. The yield was 220 mg. (0.22%), and the product showed the same properties as previously described.

Example 15

"Crude phosphatidyl serine fraction" (0.75 g.) was obtained as described in Example 1A and B. A precipitating mixture (66 ml.) of acetone-ethanol, 1:3, was substituted for the one described in 1C.

Yield was 0.22 g. (0.22%) of "purified phosphatidyl serine fraction" of similar purity and anti-coagulant activity to those described before.

I claim:

1. A process for the preparation of phosphatidyl serine comprising extracting mammalian brain with a single phase solvent system comprising chloroform, methanol and water in proportions, v./v./v., of about 1:2:0.8, adjusting the solvent proportions in the extract to effect phase separation into an upper aqueous phase and a lower chloroform phase, separating the extract from the residual material, separating said chloroform phase and evaporating chloroform to provide a total lipid extract, dissolving said total lipid extract in a chlorinated solvent and precipitating a crude phosphatidyl serine fraction with a lower aliphatic alcohol or lower aliphatic alcohol-ketone solvent mixture, and purifying said crude phosphatidyl serine fraction by extraction with a chlorinated solvent, or with a mixture of chlorinated solvent and diethyl ether or low boiling petroleum solvent, followed by evaporation of the solvent, redissolution of the residual material in chloroform and precipitation of the phosphatidyl serine product with a lower aliphatic alcohol or lower aliphatic alcohol-ketone mixture.

2. The process of claim 1 wherein the solvent proportions are adjusted by addition of chloroform and water to effect phase separation.

3. The process of claim 1 in which the mammalian brain is beef brain.

4. The process of claim 1 in which the mammalian brain is hog brain.

5. The process of claim 1 in which the chlorinated solvent in which the total lipid extract is dissolved is chloroform.

6. The process of claim 1 in which the chlorinated solvent in which the total lipid extract is dissolved is methylene chloride.

7. The process of claim 1 in which the chlorinated solvent in which the total lipid extract is dissolved is ethylene dichloride.

8. The process of claim 5 wherein the crude phosphatidyl serine fraction is precipitated with a mixture of ethanol and acetone.

9. The process of claim 5 wherein the crude phosphatidyl serine fraction is precipitated with a mixture of ethanol and acetone in about 3:1 proportions v./v.

10. The process of claim 5 wherein the crude phosphatidyl serine fraction is precipitated with ethanol.

11. The process of claim 5 wherein the crude phosphatidyl serine fraction is precipitated with a mixture of n-propanol and acetone.

12. The process of claim 5 wherein the crude phosphatidyl serine fraction is precipitated with a mixture of methanol and acetone.

13. The process of claim 1 wherein the crude phosphatidyl serine fraction is purified by extraction with a mixture of chloroform and diethyl ether followed by precipitation from the extract.

14. The process of claim 1 wherein the crude phosphatidyl serine fraction is purified by extraction with a mixture of chloroform and petroleum ether followed by precipitation from the extract.

15. The process of claim 1 wherein the crude phosphatidyl serine fraction is purified by extraction with methylene chloride followed by precipitation from the extract.

16. The process of claim 1 wherein the crude phosphatidyl serine fraction is purified by extraction with ethylene dichloride followed by precipitation from the extract.

17. The process of claim 1 wherein the crude phosphatidyl serine fraction is purified by extraction with a mixture of ethylene dichloride and petroleum ether followed by precipitation from the extract.

18. A method for the preparation of phosphatidyl serine comprising extracting mammalian brain with a single phase solvent system comprising chloroform, methanol, and water in proportions, v./v./v., of about 1:2:0.8, adding chloroform and water to the extract to effect phase separation into an upper aqueous phase and a lower chloroform phase, separating the extract from residual material, separating the chloroform phase, evaporating chloroform from said chloroform phase to provide a total lipid extract, dissolving said total lipid extract in chloroform, precipitating a crude phosphatidyl serine fraction by combining the resulting chloroform solution with ethanol-acetone, and purifying said crude phosphatidyl serine fraction by extraction with a mixture of chloroform and petroleum ether followed by evaporation of the extract, redissolution of the residual material in chloroform and precipitation of phosphatidyl serine by combination of the chloroform solution with ethanol-acetone.

19. The method of claim 18 wherein the ethanol-acetone mixture for the precipitation of the crude phosphatidyl serine fraction contains about three volumes of ethanol for each volume of acetone and the ethanol-acetone mixture for the precipitation of the purified phosphatidyl serine contains about equal volumes of ethanol and acetone.

References Cited

Wittcoff, The Phosphatides (1951), pp. 28–30, QP 801 P45 W5.

Folch, J. Biol. Chem. (1942), vol. 146, 35–44, QP 501 J7.

ALEX MAZEL, *Primary Examiner.*

J. A. NARCAVAGE, *Assistant Examiner.*

U.S. Cl. X.R.

167—65; 260—705